E. R. NICHOLS.
FRONT AXLE DRIVE FOR MOTOR VEHICLES.
APPLICATION FILED MAY 2, 1913.
1,095,916.
Patented May 5, 1914.
2 SHEETS—SHEET 2.
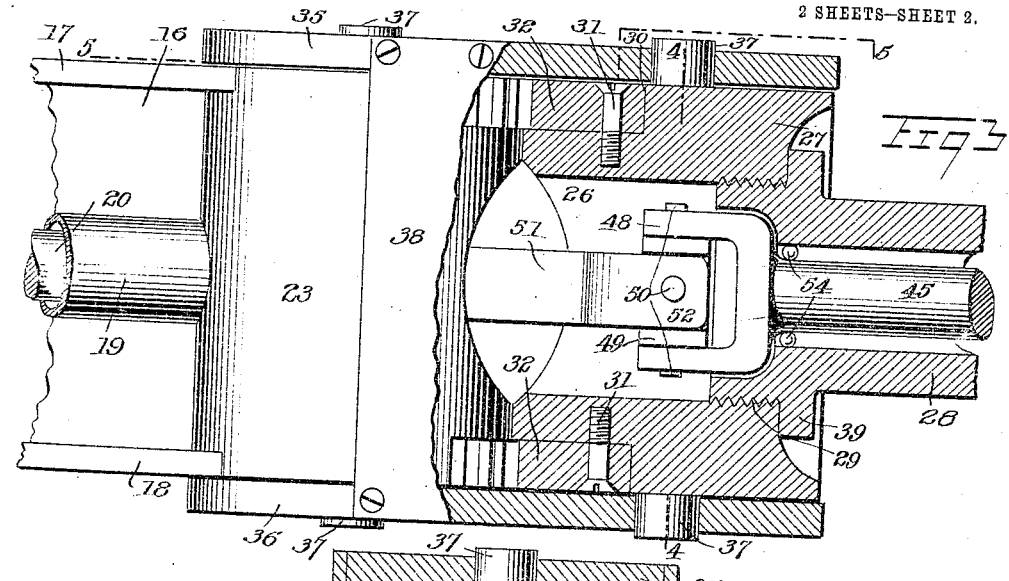
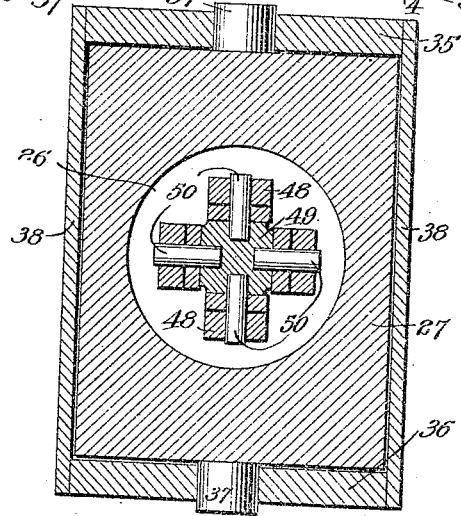
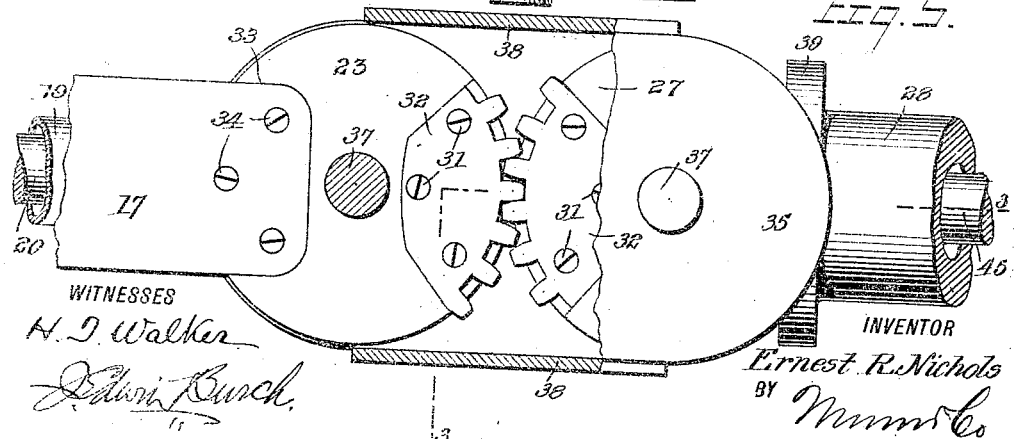
WITNESSES
H. D. Walker
INVENTOR
Ernest R. Nichols
BY
ATTORNEYS

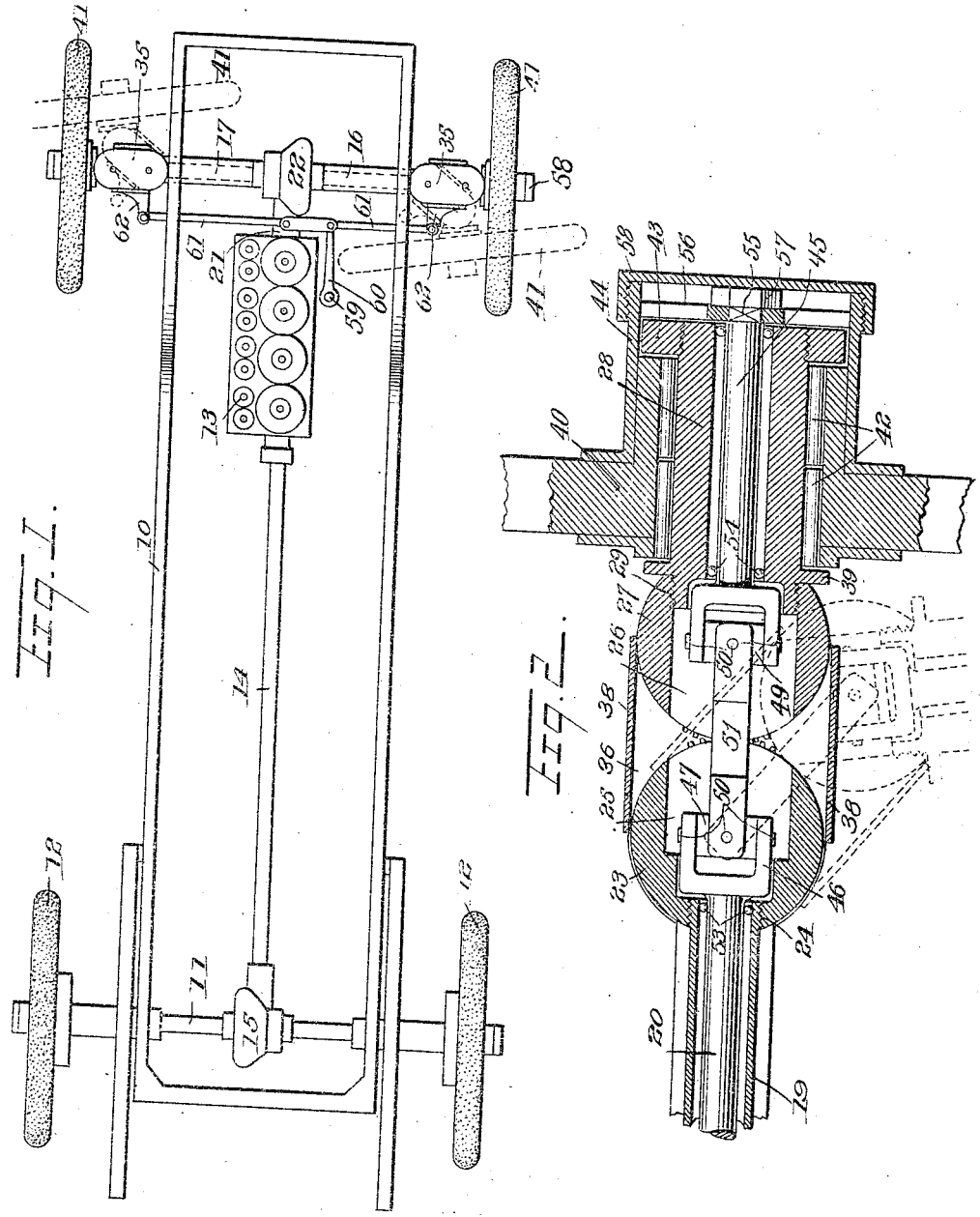

UNITED STATES PATENT OFFICE.

ERNEST REUBEN NICHOLS, OF CHICAGO, ILLINOIS.

FRONT-AXLE DRIVE FOR MOTOR-VEHICLES.

1,095,916.  Specification of Letters Patent.  Patented May 5, 1914.

Application filed May 2, 1913. Serial No. 765,017.

*To all whom it may concern:*

Be it known that I, ERNEST R. NICHOLS, a citizen of the United States, and a resident of Chicago, in the county of Cook and State of Illinois, have invented a new and Improved Front-Axle Drive for Motor-Vehicles, of which the following is a full, clear, and exact description.

The present invention comprehends an improved means for driving a motor vehicle, and especially a farm tractor, through a shaft carried by the front or steering axle, and the invention resides in an improved universal joint or drive connection between the main part of the front axle and the spindle ends thereof, so as to increase the pulling power of the vehicle.

A further object of the invention consists in the provision of a coupling device or joint including a novel arrangement of geared parts inclosed within a casing between the main part of the axle and the spindle ends thereof, so that during rotation of the spindle ends through the instrumentality of a drive shaft carried by said axle, proper angular movements of the front wheels to a maximum degree will be assured.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which like characters of reference indicate corresponding parts in all the views, and in which—

Figure 1 is a plan view of a chassis of a motor car having the improved drive connections for the front axle and wheels; Fig. 2 is an enlarged horizontal sectional view through one end of the axle and the joint and showing the manner of attaching one of the front wheels for driving through the same; Fig. 3 is a side elevation of one of the drive connections on an enlarged scale, the same being shown partly in section; Fig. 4 is a vertical sectional view taken on the line 4—4 of Fig. 3; and Fig. 5 is a horizontal sectional view taken on the line 5—5 of Fig. 3.

In the drawings, the numeral 10 indicates the frame of a motor car, which may be of any approved design, and the numeral 11 indicates the rear or drive axle through which rotation is imparted to the rear wheels 12 from a motor 13. The motor is operatively geared to the rear axle 11 from its drive shaft 14, through the instrumentality of a suitable differential gearing contained in a casing 15. The front axle is indicated by the numeral 16 and such axle is in the form of an I-beam providing top and bottom flanges 17 and 18, and is further provided with a central longitudinal casing 19 in which a shaft 20 is rotatably journaled, such shaft constituting the front drive of the vehicle. The front shaft is operatively driven from the motor through the instrumentality of an auxiliary drive shaft 21 through suitable differential gearing mounted in a casing 22 carried by the front axle.

Joined to each extremity of the main axle portion 16 is a cylindrical shell 23, the same being preferably threaded thereon, as shown at 24, and permanently held in vertical positions, but further hollowed out longitudinally as shown at 25. Communicating with the hollowed-out portions 25 of the shells 23 are the hollowed-out portions 26 of co-operating outer shells 27, which are of similar form but which are threaded on a bearing sleeve 28 outwardly of each shell 27, as shown at 29. Each of the shells 23 and 27 are provided with upper and lower recesses 30 adjacent their co-acting top and bottom edges, such recesses being of substantially segmental form and having removably secured therein, as by means of fastening screws 31, segmental gears 32 which normally intermesh.

The top and bottom portions 17 and 18 of the axle 16 are removably secured in diametrically opposed recesses 33 with relation to the recesses 30, in the top and bottom faces of the shells, by means of fastening devices or screws 34 so that the exposed faces of the gears and top and bottom portions of the axle are flush with the top and bottom faces of the shells. These parts are all inclosed in a casing, each of which includes top and bottom plates 35 and 36 having spaced circular openings through which upper and lower bearing pins 37 are journaled, the extremities of the top and bottom plates being convexly arcuate in concentric relation to said pins, while the side plates 38 are connected to said top and bottom plates and have their extremities terminating at connecting lines passing through the centers of the pins.

The bearing sleeves 28 are each provided with flanges 39 adjacent to the threaded portions 29 and these flanges serve to limit the inward thrust of the hub portions 40 of the front driving and steering wheels 41, which are rotatably journaled on said bearing sleeves through the instrumentality of antifriction bearings in the form of rollers 42. Bearing rings 43 are threaded on the reduced ends of the bearing sleeves 28 and serve to limit the outward thrust of the wheels on the bearing sleeves, and it is to be observed that the hubs are provided with metallic portions 44 which inclose the bearing rings 43 and which extend outwardly beyond the latter. The spindle ends of the axle of the front drive shaft are indicated by the numeral 45, the same having universal connections with the shaft, as indicated in the drawings. These connections each preferably embody forks 46 formed on the outer ends of the shaft 20, between which blocks 47 are pivoted, while the inner ends of the spindle 45 are provided with forks 48 between which blocks 49 are pivoted. These pivot blocks 47 and 49 are provided with pivots 50 extending at right angles to the blocks, and said pins serve for the pivotal connection of the forks 46 and 48 by means of connecting links 51 having forked extremities 52 engaged with said pivot pins 50.

By the above-described means, the rotation imparted to the front drive shaft 20 as the latter rotates on its bearing 53, may be transmitted to the spindles 45, as the latter rotate on their bearings 54, irrespective of the angular relation of said spindles with the shaft. By reason of the construction described the spindles may be turned to a maximum degree through angles of 80°, as illustrated in Figs. 1 and 2 of the drawings by the dotted line positions of the parts, so that the especial adaptability of the device as a farm tractor is enhanced by reason of the short turns which can be made. The spindles 45 are fixed to the wheels 41, and for this purpose said spindles are provided with squared portions 55 engaged through similar openings in spider connections 56 of the extended ends of the metallic portions 44 forming the casings of the hubs, binding nuts 57 being threaded on the spindle ends to secure the parts in fixed relation, while caps 58 are threaded on said extensions to prevent the entrance of dust and grit into the bearing parts.

The front wheels are turned in angular directions by means of the usual steering standard 59 which is connected by means of a link 60 to rods 61 by means of an intermediate pivot connection, while the rods 61 are in turn pivotally connected to outstanding brackets 62 rigid with the rear plates 38 of the coupling casings. Thus, by rotating the steering standard angular movement is imparted to the brackets 62 which will in turn shift the casings on their pivots 37 which are disposed innermost, and as the parts are thus rotated the intermeshed gears 32 will cause the bearing sleeves and spindles to be shifted in angular directions with relation to the front axle and drive shaft, depending upon the degree of rotation of the standard, and rotation will be imparted to the spindles continuously through the universal coupling between the extremities of the shaft 20 and the spindles.

Having thus described my invention, what I claim as new and desire to secure by Letters Patent is:—

1. In a drive mechanism for motor vehicles, the combination with a motor and a rear drive axle operatively driven thereby; of a front steering axle having a shaft also driven by said motor, said shaft having spindle ends having universal connections with the shaft, a part fixed to the axle and a pair of movable parts hinged together, one of the latter parts being pivoted to the immovable part.

2. In a drive mechanism for motor vehicles, the combination with a motor and a rear drive axle operatively driven thereby; of a front steering axle having a shaft also driven by said motor, said shaft having spindle ends having universal connections with the shaft, a stationary part and a rotatable part each having gears normally in engagement, and means for simultaneously shifting the connections on their pivots whereby the rotatable part will be positively rotated to angularly shift the spindle ends of the front drive shaft.

3. In a front axle drive for motor vehicles embodying the combination with a central axle and a shaft rotatably carried thereby; of geared means for rotating the shaft, a motor, casings at the extremities of the axle, a pair of parts in each casing, one of each pair of parts being angularly movable and having a bearing sleeve, wheels rotatable on the bearing sleeves, spindles journaled through the sleeves and fixed to the wheels, and universal couplings between the extremities of the shaft and the spindles.

4. In a front axle drive for motor vehicles embodying the combination with a central axle and a shaft rotatably carried thereby; of geared means for rotating the shaft, a motor, casings at the extremities of the axle, a pair of parts in each casing, one of each pair of parts being movable horizontally, and having a bearing sleeve, wheels rotatable on the bearing sleeves, spindles journaled through the sleeves and fixed to the wheels, and universal couplings between the extremities of the shaft and the spindles, said parts being positively engaged to partially rotate, whereby the spindles and bearing sleeves will be angularly shifted.

5. In a front axle drive for motor vehicles embodying the combination with a central axle and a shaft rotatably carried thereby; of geared means for rotating the shaft, a motor, casings at the extremities of the axle, a pair of shells in each casing and pivoted thereto, one of each pair of shells being stationary and the other pivoted with respect to the axle, the pivoted shells each having a bearing sleeve, wheels rotatable on the bearing sleeves, spindles journaled to the sleeves and fixed to the wheels, universal couplings between the extremities of the shaft and the spindles, brackets secured to the casings, and a steering standard having a pivotal connection with the brackets for moving the outer shells on their pivots.

6. The combination with a motor; of an axle having top and bottom plates and a central casing, a shaft journaled in the casing and geared to the motor to be continuously rotated, spindles, a universal coupling between the extremities of the shaft and the spindles at the inner ends of the latter, a casing removably attached to the axle and having top and bottom plates and plates connecting the same, said top and bottom plates each having a pair of apertures, pairs of circular shells having pivot pins journaled in the apertures, said shells having recesses, segmental gears in said recesses whereby the outer shells of the respective pairs of shells will oscillate in unison, a bearing sleeve removably secured in the outermost of each pair of shells and inclosing a spindle, a wheel rotatable on each sleeve and held against end thrust, and means for securing the spindles to the wheels for rotating the latter as the shaft is driven during angular adjustment of the parts.

7. The combination with a motor; of an axle having top and bottom plates and a central casing, a shaft journaled in the casing and geared to the motor to be continuously rotated, spindles, a universal coupling between the extremities of the shaft and the spindles at the inner ends of the latter, a casing removably attached to the axle and having top and bottom plates and plates connecting the same, said top and bottom plates each having a pair of apertures, pairs of circular shells having pivot pins journaled in the apertures, said shells having recesses, segmental gears in said recesses whereby the outer shells of each pair will oscillate in opposite directions with respect to the axle, a bearing sleeve removably secured in the innermost of each pair of shells and inclosing a spindle, a wheel rotatable on each sleeve and held against end thrust, means for securing the spindles to the wheels for rotating the latter as the shaft is driven, and means for moving the casings on the pivots of the innermost shells.

8. The combination with a motor; of an axle having top and bottom plates and a central casing, a shaft journaled in the casing and geared to the motor to be continuously rotated, spindles, a universal coupling between the extremities of the shaft and the spindles at the inner ends of the latter, a casing removably attached to the axle and having top and bottom plates and plates connecting the same, said top and bottom plates each having a pair of apertures, pairs of circular shells having pivot pins journaled in the apertures, said shells having recesses, segmental gears in said recesses whereby the outer shells and casings will oscillate in unison, a bearing sleeve removably secured in the innermost of each pair of shells and inclosing a spindle, a wheel rotatable on each sleeve and held against end thrust, said spindles having square outer portions, extensions carried by the hubs of the wheels, and a spider carried by each extension and having a squared aperture receiving the squared portion of a spindle to cause a wheel to rotate with its spindle.

9. In a drive mechanism for motor vehicles, the combination with a motor and a rear drive axle operatively driven thereby; of a front steering axle having a shaft also driven by said motor, said shaft having spindle ends having universal connections with the shaft, a part fixed to the axle, and a pair of movable parts pivotally connected, one of said parts and the fixed part being disposed in positive engagement and the other movable part being pivoted to the immovable part.

10. In a drive mechanism for motor vehicles, the combination with a motor and a rear drive axle operatively driven thereby; of a front steering axle having a shaft also driven by said motor, spindle ends on said shaft, double universal connections between the spindle ends and shaft, a part fixed to each end of the axle, and a pair of movable parts pivoted to each fixed part, one of each pair of movable parts being disposed in drive engagement with the adjacent fixed part and supported on the adjacent spindle ends to which vehicle wheels are adapted to be secured.

11. In a drive mechanism for motor vehicles, the combination with a motor and a rear drive axle operatively driven thereby; of a front steering axle having a shaft also driven by said motor, spindle ends for said shaft, universal connections between the spindle ends and shaft, a part fixed to each end of the axle, a bearing sleeve on each spindle end, and a pair of movable parts between each sleeve and fixed part, one of each pair of movable parts being geared to the adjacent fixed part.

In testimony whereof I have signed my name to this specification in the presence of two subscribing witnesses.

ERNEST REUBEN NICHOLS.

Witnesses:
J. S. COPLEY,
M. O'DONNELL.